United States Patent
Chen et al.

(10) Patent No.: US 9,001,531 B2
(45) Date of Patent: Apr. 7, 2015

(54) CONTROL DEVICE FOR DC-DC CONVERTER AND CONTROL METHOD CONTROLLING THE SAME

(71) Applicant: National Taiwan University, Taipei (TW)

(72) Inventors: Yaow-Ming Chen, Taipei (TW); Yang-Lin Chen, Taipei (TW)

(73) Assignee: National Taiwan University, Taipei (TW)

( * ) Notice: Subject to any disclaimer, the term of this patent is extended or adjusted under 35 U.S.C. 154(b) by 205 days.

(21) Appl. No.: 13/760,166

(22) Filed: Feb. 6, 2013

(65) Prior Publication Data
US 2014/0097821 A1 Apr. 10, 2014

(30) Foreign Application Priority Data
Oct. 4, 2012 (TW) .............................. 101136640 A (51) Int. Cl.
*H02M 3/335* (2006.01)
*G05F 1/46* (2006.01)
(Continued)

(52) U.S. Cl.
CPC .............. *G05F 1/468* (2013.01); *H02M 1/4225* (2013.01); *H02M 2001/0058* (2013.01); *Y02B 70/126* (2013.01); *Y02B 70/1491* (2013.01)

(58) Field of Classification Search
CPC ............... H01L 2924/00; H01L 22/14; H02M 2001/0025; H02M 3/33507; H02M 2001/0009; H02M 3/156
USPC .................. 363/16, 21, 12, 80, 81, 89, 21.12, 363/21.13; 323/222, 282–288
See application file for complete search history.

(56) References Cited

U.S. PATENT DOCUMENTS 5,687,070 A * 11/1997 Jacobs et al. .................. 363/126
7,196,503 B2 * 3/2007 Wood et al. .................... 323/276
(Continued)

FOREIGN PATENT DOCUMENTS

TW        I288314        10/2007

OTHER PUBLICATIONS

Laszlo Huber et al. Effect of valley switching and switching-frequency limitation on-line current distortions of DCM/CCM boundry boost PFC conveters Power electronics, IEEE transction on (vol. 24, Issue 2) Dec. 2008 pp. 339-347.*

(Continued)

*Primary Examiner* — Rajnikant Patel
(74) *Attorney, Agent, or Firm* — Li & Cai Intellectual Property (USA) Office (57) ABSTRACT

A control device for a DC-DC converter, which receives an input power and generates an output voltage, includes a first error amplifier for comparing a reference voltage signal and the output voltage to generate a feedback signal, a sampling and holding control circuit coupled to the first error amplifier for generating a reference current signal according to the feedback signal and an input current associated with the input power, a filter for receiving the input current associated with the input power and generating an average current value according to the input current, a second error amplifier coupled to the sampling and holding and the filter for comparing the reference current signal and the average current value before generating a control signal, and a switching control circuit coupled to the second error amplifier for generating a switching signal according to the control signal from the second error amplifier.

10 Claims, 12 Drawing Sheets

(51) Int. Cl.
*H02M 1/42* (2007.01)
*H02M 1/00* (2006.01)

(56) References Cited

U.S. PATENT DOCUMENTS 7,391,630 B2 * 6/2008 Acatrinei .................. 363/89
7,456,621 B2 * 11/2008 Leung et al. ............... 323/283
7,919,952 B1 * 4/2011 Fahrenbruch .............. 323/222

OTHER PUBLICATIONS

Shi-Huang Tang, et al.,"A New On-Time Adjustment Scheme for the Reduction of Input Current Distortion of Critical-Mode Power Factor Correction Boost Converters", Power Electronics Conference (IPEC), 2010 International, Jun. 21-24, 2010, pp. 1717-1724, Sapporo.
Laszlo Huber, et al.,"Effect of Valley Switching and Switching-Frequency Limitation on Line-Current Distortions of DCM/CCM Boundary Boost PFC Converters", Power Electronics, IEEE Transactions on (vol. 4 , Issue: 2 ), Dec. 22, 2008, pp. 339-347.
Jen-Chieh Tsai, et al.,"Perturbation On-Time (POT) Technique in Power Factor Correction (PFC) Controller for Low Total Harmonic Distortion and High Power Factor", Power Electronics, IEEE Transactions on (vol. 28 , Issue: 1 ), Apr. 19, 2012, pp. 199-212.
Yang-Lin Chen, et al.,"The Time-Domain Analysis for Constant On-Time Critical Mode Boost-Type PFC Converters", Energy Conversion Congress and Exposition (ECCE), 2012 IEEE, Sep. 15-20, 2012, pp. 4643-4648, Raleigh, NC.

* cited by examiner

CONTROL DEVICE FOR DC-DC CONVERTER AND CONTROL METHOD CONTROLLING THE SAME

BACKGROUND OF THE INVENTION

1. Field of the Invention

The instant disclosure relates to a direct current-direct current (DC-DC) converter, and more particularly, to a control device for the DC-DC converter and a method controlling the same.

2. Description of Related Art

Figure 1A:
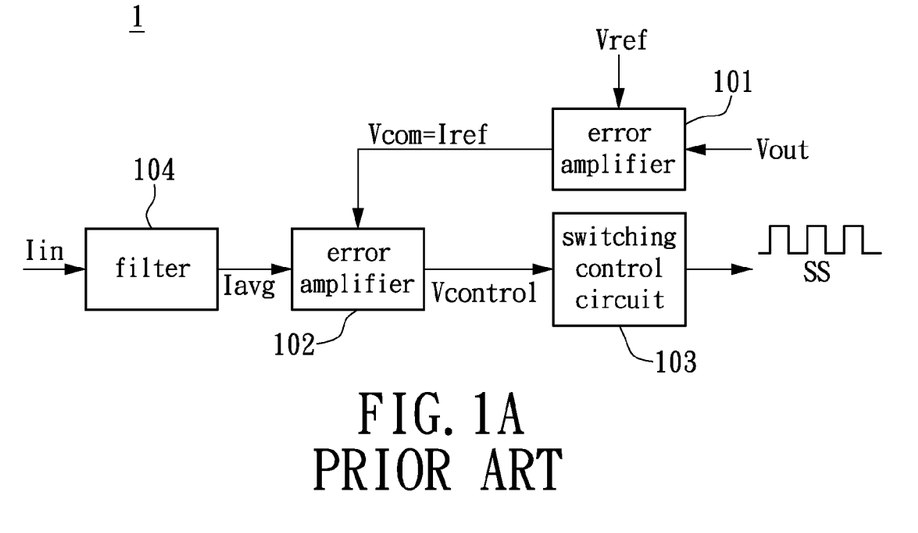
FIG. 1A is a simplified block diagram of a traditional voltage/current feedback circuit in an average current control mode.

Referring to FIG. 1A, FIG. 1A is a simplified block diagram of a traditional voltage/current feedback circuit in an average current control mode. Traditionally, in order to enable a power converter to perform the current control in a stable manner and with better/quicker transient response, both current feedback control circuit and voltage feedback control circuit are incorporated into the conventional DC-DC converter. As shown in FIG. 1A, an error amplifier 101 compares an output voltage Vout with a reference voltage signal Vref, and outputs a feedback signal Vcom, which is used as a reference current signal Iref for an input current Vin (in other words, Vcom=Iref). A control circuit 103 converts a current feedback control signal Vcontrol outputted by the error amplifier 102, which is a control voltage, into a switching signal SS.

Figure 1B:
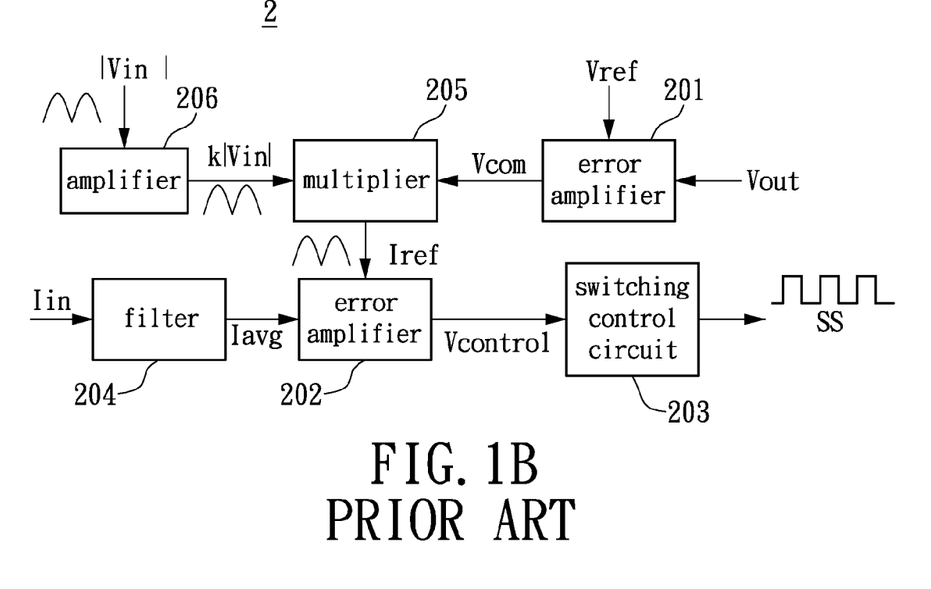
FIG. 1B is a simplified lock diagram showing another traditional voltage/current feedback circuit, which is capable of performing the power factor correction.

Referring to FIG. 1B, FIG. 1B is a simplified lock diagram showing another traditional voltage/current feedback circuit, which is capable of performing the power factor correction. To be capable of performing the power factor correction, the reference current signal Iref in FIG. 1A is outputted by a multiplier 205, and the variation in the reference current signal is dictated by the feedback of the output voltage Vout to the input voltage Vin. For example, when the output voltage Vout is the given value, and the input voltage Vin is a rectified city power sinusoidal wave, the reference current signal could become another rectified sinusoidal wave. Accordingly, the converter in addition to functioning as the DC-DC converter can be capable of performing the power factor correction.

When it comes to current feedback control, a peak current mode-based approach and an average current mode-based approach are usually employed. In the peak current mode-based approach, extra slope compensation for the current may require when the duty cycle of the conduction of the switch is larger than 50%, which may lead to system instability. When the same peak current mode approach is applied in the power factor correction using the discontinuous conduction mode, the input current waveform may be distorted, resulting in the portion of the harmonic waves of different orders in the input current waveform staying too large. However, the use of the average current mode-based approach does not accompany with the aforementioned problems, and therefore is better suited to the DC-DC converters and the power factor correctors in different conduction modes.

When the power factor corrector operates in the current control mode, the control circuit often uses a multiplier to generate the current reference value, as shown in FIG. 1B. But of the expense, the complexity, and the inherent bandwidth limitation of the multiplier, a sampling and holding (S/H) circuit is proposed to replace the multiplier according to "A general technique for derivation of average current mode control laws for single-phase power-factor-correction circuits without input voltage sensing" by J. Rajagopalan, F. C. Lee and P. Nora in IEEE Transactions on Power Electronics, Vol. 14, No. 4, pp. 663-672, July 1999. This particular proposed approach when used in the DC-DC converters could perform as desired in a continuous conduction mode (CCM), critical mode (CRM) and discontinuous conduction mode. However, when used in power factor correction context, for maintaining the current wave in the desired form and the power factor, the power factor corrector having the proposed approach incorporated may need to be operating in the CCM. Meanwhile, in order to minimize the switching energy loss associated with the switching of the switching elements (e.g., switches and diodes) and therefore improve the conversion efficiency. The power converters may have to operate more in the CRM and the discontinuous conduction mode. Therefore, a novel power converter control circuit (or device) in design is still in need.

SUMMARY OF THE INSTANT DISCLOSURE

A control device for the DC-DC converter and a control method controlling the same are provided in the instant disclosure. The control device according to one embodiment of the instant disclosure replaces the multiplier in the traditional control device and could be applicable in the CRM or the discontinuous conduction mode of the average current control mode-based approach.

The proposed control device for the DC-DC converter, which receives an input power and generates an output voltage, includes a first error amplifier for comparing a reference voltage signal and the output voltage to generate a feedback signal, a sampling and holding control circuit coupled to the first error amplifier for generating a reference current signal according to a feedback signal and an input current associated with the input power, a filter for receiving the input current associated with the input power and generating an average current value according to the input current, a second error amplifier coupled to the sampling and holding and the filter for comparing the reference current signal and the average current value before generating a control signal, and a switching control circuit coupled to the second error amplifier for generating a switching signal according to the control signal from the second error amplifier, wherein the switching signal controls a conduction time of a switching element of the DC-DC converter.

The control method provided in the instant disclosure includes comparing a reference voltage and the output voltage of the DC-DC converter to generate a feedback signal, utilizing a sampling and holding control circuit to generate a reference current signal according to the feedback signal and an input current associated with the input power, comparing the reference current signal and an average current value of the input current to generate a control signal, and generating a switching signal according to the control signal, wherein the switching signal controls a conduction time of a switching element of the DC-DC converter.

Therefore, the control device and the control method provided in the instant disclosure could eliminate the usage of the multiplier and be capable of performing the power factor correction.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

One Embodiment of Instant Disclosure

The instant disclosure provides a control device and a control method for a DC-DC converter relying on sampling and holding of a sampling and holding control circuit to replace the conventional multiplier. The instant disclosure could be used in the average current control mode-based approach and the operations in the CRM or the discontinuous conduction mode. Eliminating the usage of the multiplier shown in FIG. 1B, the instant disclosure could therefore have an analog-based control method realized after having the sampling and holding control circuit integrated and lowers the manufacturing cost. Meanwhile, in addition to being applied to the DC-DC converter, the instant disclosure could further compensate the heavily distorted current and limit the THD when used in the setting of the power factor corrector.

Figure 2:
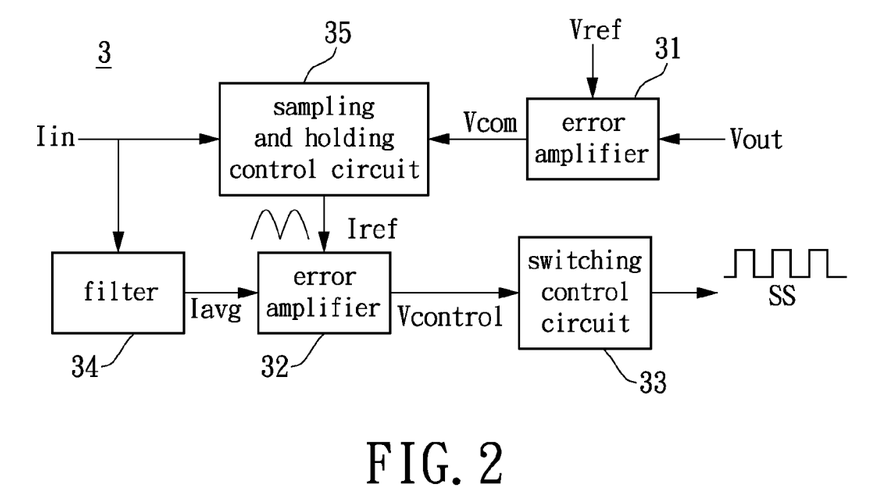
FIG. 2 is a simplified block diagram of a control device for the DC-DC converter according to one embodiment of the instant disclosure.

Please refer to FIG. 2, which is a simplified circuit block diagram of a control device 3 for a DC-DC converter according to one embodiment of the instant disclosure. A sampling and holding control circuit 35 shown in FIG. 2 may be used to replace the conventionally used multiplier. The control device 3 for the DC-DC converter (hereinafter referred to as the control device) may include an error amplifier 31 (i.e., a first error amplifier), the sampling and holding control circuit 35, a filter 34, another error amplifier 32 (i.e., the second error amplifier) along with a switching control circuit 33. The DC-DC converter controlled by the control device 3 may receive an input power to generate an output voltage.

The sampling and holding control circuit 35 may be coupled to the error amplifier 31, when the error amplifier 32 may be coupled to the sampling and holding control circuit 35 and the filter 34. The switching control circuit 33 may be coupled to the error amplifier 32.

The error amplifier 31 may be adapted to compare a reference voltage signal Vref and an output voltage Vout to generate feedback signal Vcom. The sampling the holding control circuit 35 may also include a sampling and holding unit (not shown) for sampling and holding an current of an inductor (not shown) of the DC-DC converter as a reference current signal. The sampling and holding control circuit 35 according to the feedback signal Vcom and an input current Iin associated with the input power (not shown) may generate the reference current signal Iref. The filter 34, meanwhile, may receive the input current Iin associated with the input power, and generate an average current value Iavg of the input current Iin according to the input current Iin. The error amplifier 32 may compare the reference current signal Iref and the average current value Iavg and generating a control signal Vcontrol. The switching control circuit 33 in accordance with the control signal Vcontrol outputted by the error amplifier 32 may generate a switching signal SS for controlling the conduction time of a switching element of the DC-DC converter (not shown).

Figure 3:
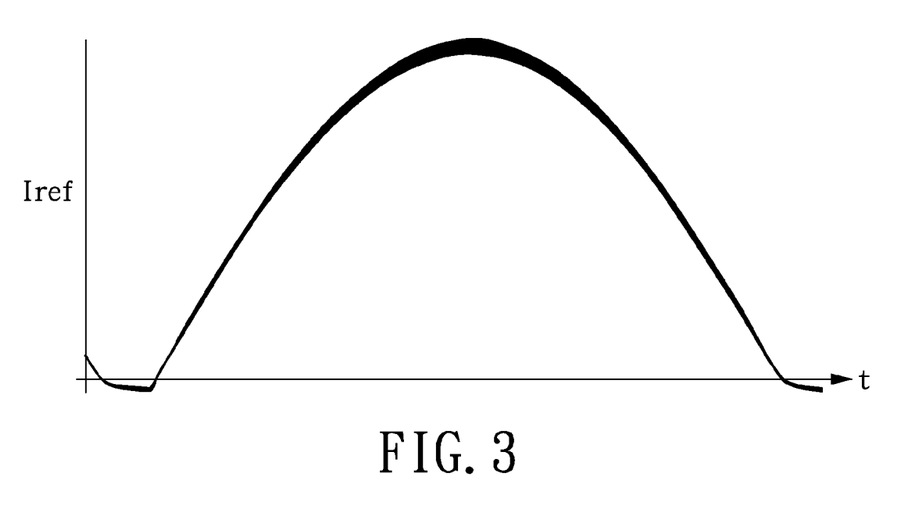
FIG. 3 shows a waveform of the reference current signal outputted by the multiplier in FIG. 1B.

Please refer to both FIG. 1B and FIG. 3, which is a waveform diagram of the reference current signal outputted by the multiplier in FIG. 1B. As previously mentioned, the multiplier such as the multiplier 205 for outputting an output reference current is necessary for the conventional DC-DC converter using the average current control mode-based approach and operating in either the CRM or the discontinuous conduction mode for the power factor correction. The reference current signal outputted by the multiplier 205 may be expressed by the following equation (1). According to the equation (1), the multiplying rate k and the feedback signal Vcom are fixed so that the reference current signal Iref (t) could be proportional to a rectified city power voltage ($|Vin*sin(\omega t)|$). And an output waveform during a half of a city power period could be shown in FIG. 3.

$$Iref(t)=|Vin \times Sin(\omega t)| \times k \times Vcom \qquad (1)$$

Figure 4:
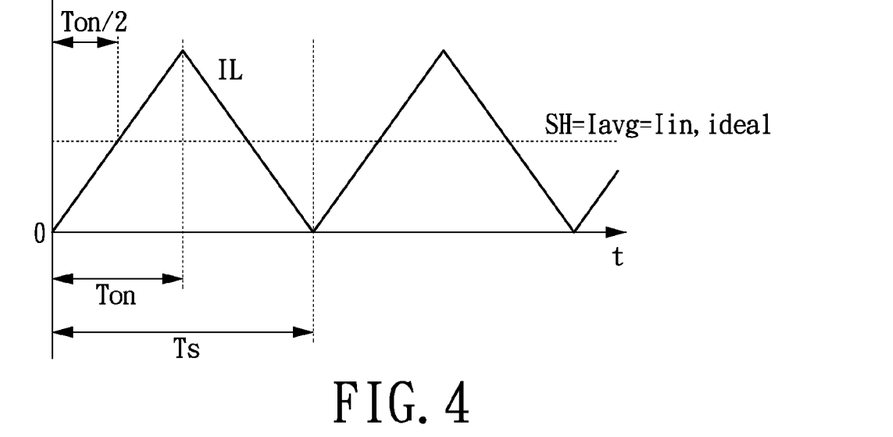
FIG. 4 shows a waveform of an inductor current of a boost-up converter operating in the CRM.
Figure 5:
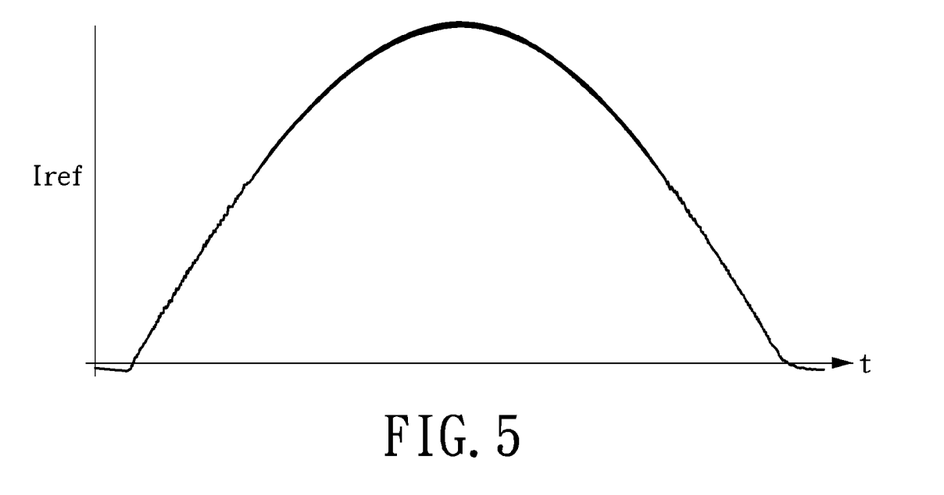
FIG. 5 shows a waveform of the reference current signal outputted by the sampling and holding control circuit of FIG. 2.

Please also refer to FIG. 2 and FIG. 4 at the same time, FIG. 4 shows a waveform of a current passing through an inductor in a boost-up converter operating in the CRM. An ideal average current value of the current passing through the inductor could be represented in the following equation (2), wherein the inductance of the inductor is L and the conduction time of the switching element is Ton. As such, when the sampling and holding control circuit could sample the current IL (or Iin) of the inductor L midway through the conduction time of the switching element (Ton/2), the ideal average current value could be obtained as well as an ideal input current value Iin, ideal, which is a signal SH sampled by the sampling and holding control circuit. The ideal average current value Iavg may serve as the reference current signal for the next switching period.

$$Iavg = \frac{Vin}{2L}Ton \quad (2)$$

According to the equation (2), when the input voltage Vin is fixed the average current value of the current passing through the inductor, which is the average current value Iavg, may be dependent on the conduction time Ton. Conversely, when the conduction time Ton is fixed, the average current value of the current passing through the inductor (i.e., the average current value Iavg) may be controlled by the input voltage Vin. Therefore, using the boost-up converter for example, when the input voltage Vin is the rectified city power voltage (or city power sinusoidal wave) and assume the conduction time of the switching element is a fixed value, the average current value Iavg may change in accordance with the periodical changes in the rectified city power sinusoidal wave (Vin*sin(ωt)) as shown in the equation (3) in below.

$$Iavg(t) = \frac{|Vin \times \sin(\omega t)|}{2L}Ton \quad (3)$$

If the sampling and holding control circuit 35 could sample the current of the inductor midway through the conduction time of the switching element, the obtained average current value Iavg could be considered as the ideal current value Iin, ideal as presented in the above. When the input voltage Vin is the rectified city power sinusoidal wave, the average current value Iavg or the current value sampled by the sampling control circuit 35 may vary along with the variation in the input voltage Vin. When the sampled average current value could serve as the reference current signal, the DC-DC converter may perform the power factor correction.

Please also refer to FIGS. 1B, 2, 3 and 5, FIG. 5 shows a waveform diagram of the reference current signal outputted by the sampling and holding control circuit in FIG. 2. Compare the waveforms in both FIGS. 3 and 5, it is believed the reference current signals outputted by the multiplier 205 of FIG. 1B and the sampling and holding control circuit 35 of FIG. 2 are substantially the same. Therefore, the multiplier 205 could be actually replaced by the sampling and holding control circuit 35.

Figure 6A:
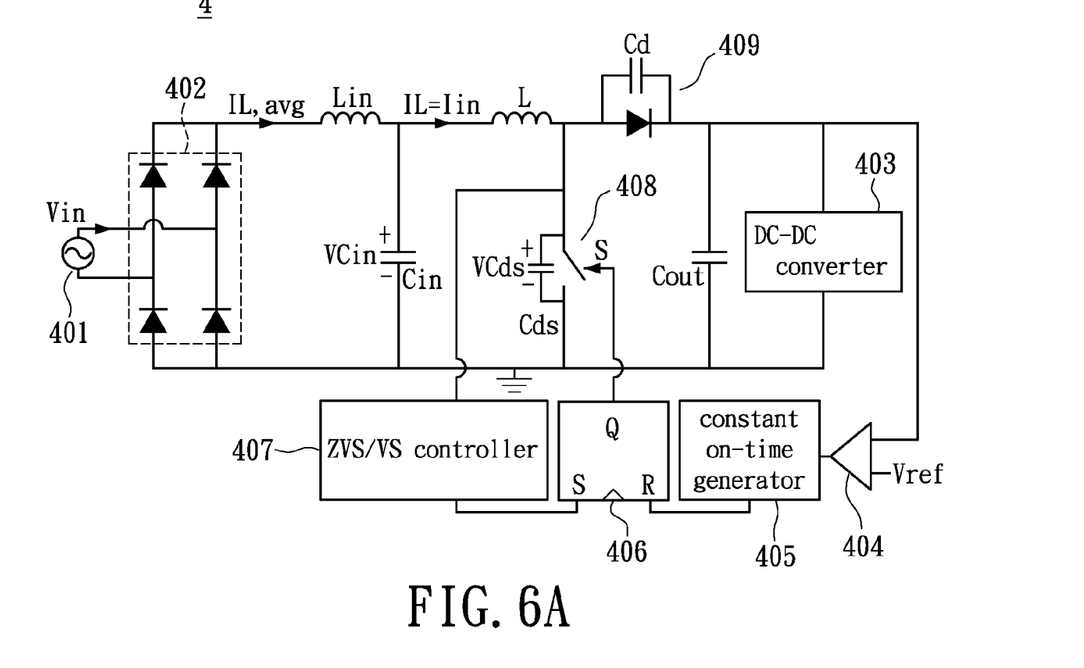
FIG. 6A is a circuit diagram of a boost-up power factor corrector that is zero voltage switching (ZVS) and valley switching (VS)-enabled.
Figure 6B:
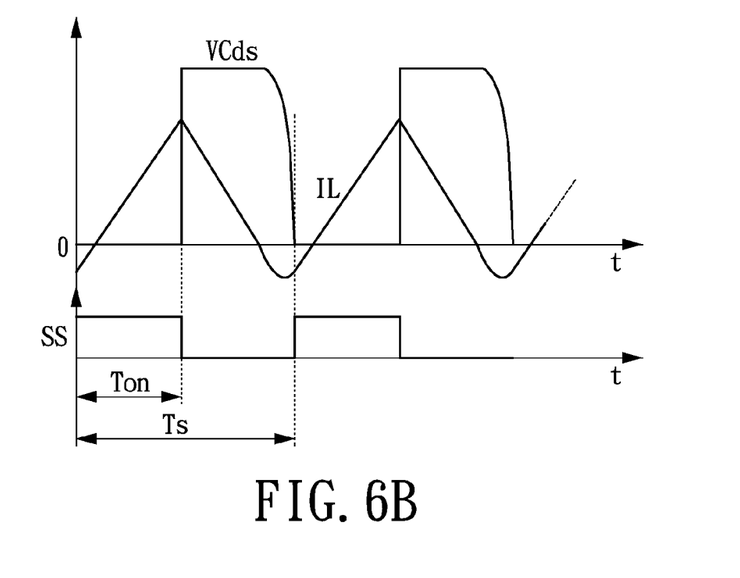
FIG. 6B shows waveforms of the inductor current of the power factor corrector and the voltage across the switching element with respect to the switching signal.

Please refer to FIGS. 6A and 6B, which are a circuit diagram of a power factor corrector and waveform diagram of the current passing through the inductor of the power factor corrector and a voltage across the switching element of the same power factor corrector with respect to the switching signal, respectively. Specifically, in order to further enhance the efficiency, the converter operating in the CRM is also valley switching (VS) or zero voltage switching (ZVS)-enabled and the ZVS-enabled and VS-enabled converter is the converter illustrated in FIG. 6A. Through the resonance between parasitic capacitors Cds and Cd of switching elements 408 and 409 and an inductor L, the voltage Vcds across the switching element 408 may be lowered to its minimum before the conduction of the switching element 408, as shown in FIG. 6B, effectively reducing the switching energy loss at the time of the conduction.

Figure 7:
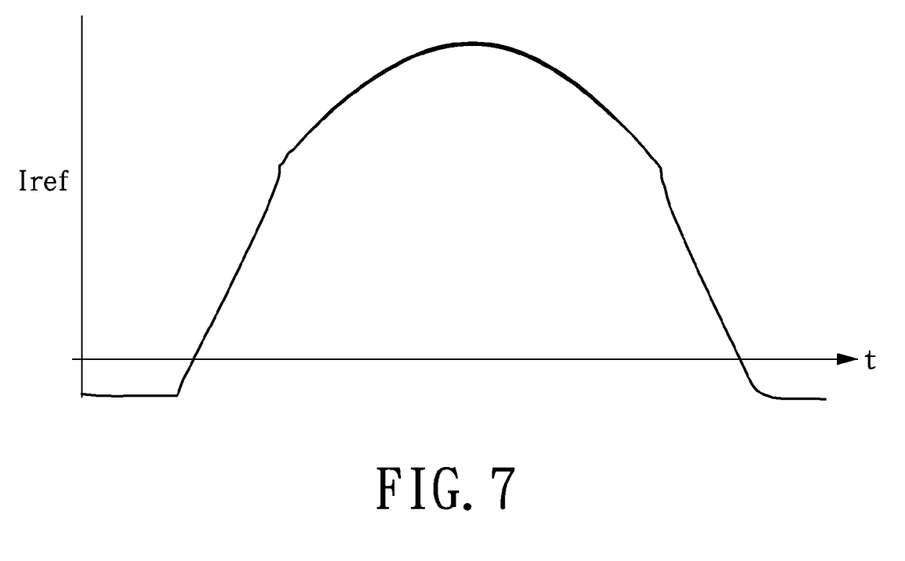
FIG. 7 is a waveform of the reference current signal sampled by one sampling and holding unit of the sampling and holding control circuit in FIG. 2.

Please refer to FIG. 7, FIG. 7 is a waveform diagram of the reference current signal sampled by a sampling and holding unit of the sampling and holding control circuit in FIG. 2. The aforementioned resonance may result in a negative current IL passing through the inductor L at the beginning of the next conduction time. Thus, relying on a single sampling and holding unit to sample the current passing through the inductor midway through the conduction time may lead to the distortion on the reference current signal Iref within the half city power period as shown in FIG. 7. Using the distorted reference current signal for the average current mode control may further render similar the waveform of the input current and the waveform shown in FIG. 7, increasing the THD.

Figure 8:
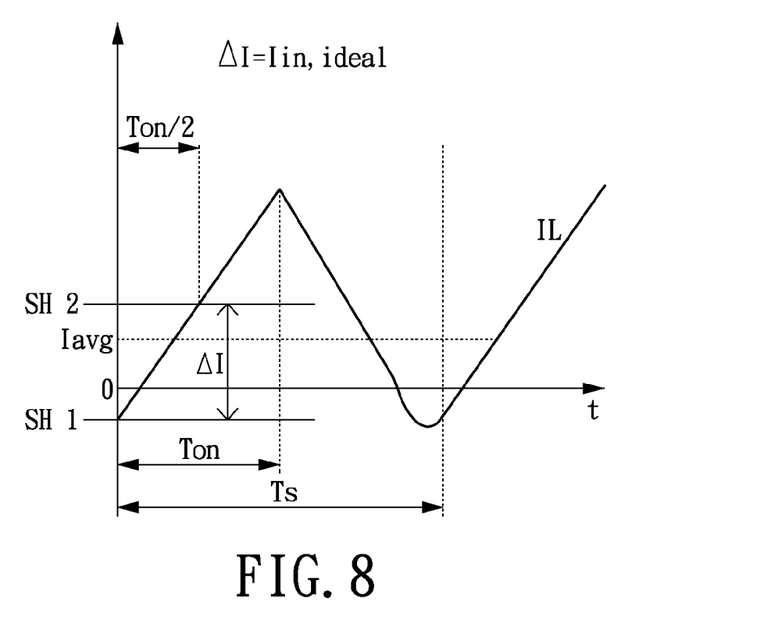
FIG. 8 is a waveform of the inductor current in the power factor corrector of FIG. 6A.

Refer to FIG. 8, which is a waveform diagram of the current passing through the inductor in the power factor corrector in FIG. 6A. As could be seen from FIG. 8, at least two sampling and holding units are disposed for sampling the current passing through the inductor when the switching element is just conducted (first sampling signal, SH1) and the current passing through the inductor midway through the conduction time of the switching element (second sampling signal, SH2). The difference between SH1 and SH2 (or ΔI) may serve as the ideal current value information Iin, ideal, which may be the average current value in the CRM operation such as the average current value Iavg shown in FIG. 4.

In other words, the proposed method in the instant disclosure may include converting the current passing through the inductor by a current-voltage converter into a corresponding voltage signal before using the sampling and holding control circuit, which replaces the multiplier, to sample the corresponding voltage signal. In doing so, the first sampling signal SH1 and the second sampling signal SH2 may be obtained as shown in FIG. 8 before being processed for the preparation of the difference ΔI between the currents passing through the inductor at different points of the conduction time present, before the same difference is considered as the current reference signal Iref.

Figure 9:
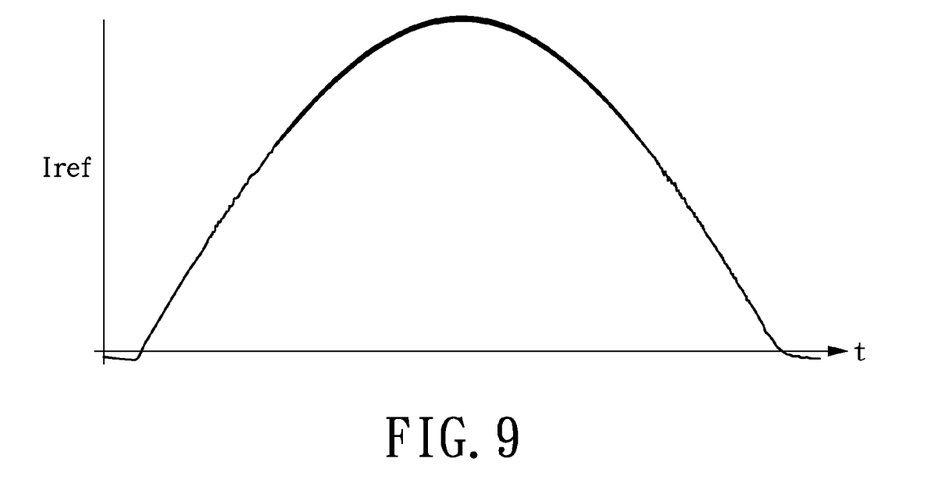
FIG. 9 is a waveform of the reference current signal sampled by two sampling and holding units of the sampling and holding control circuit in FIG. 2.

Please also refer to FIGS. 7 and 9, FIG. 9 shows a waveform diagram having the reference current signal sampled by two sampling and holding units in the sampling and holding control circuit. Compare the reference current signals Iref in both FIGS. 7 and 9, it could be found that the reference current signal Iref in FIG. 9 may near more resemblance with the ideal reference current signal Iref in FIG. 4 and may be impacted less by the variation in the input voltage Vin than the reference current signal Iref in FIG. 7.

Since the difference ΔI between the two sampled reference current signals may become the ideal current value Iin, ideal, which may serve as the reference current signal Iref in the average current control mode, the impact of the negative current passing through the inductor over the course of the operations of VS and ZVS may impact the reference current signal Iref less. In short, in the event of VS or ZVS plus the switching subject to the switching frequency limit (SFL), the outputted reference current signal could still be substantially similar to its counterpart shown in FIG. 9.

Figure 10A:
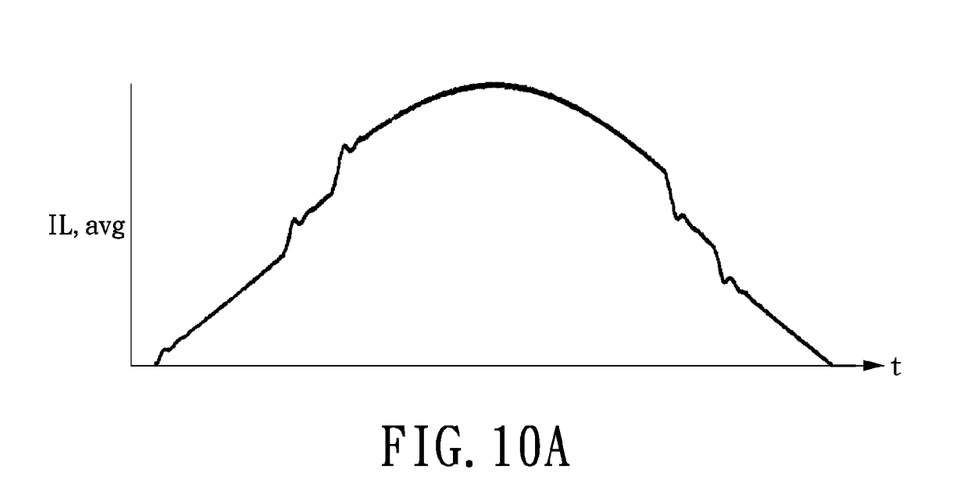
FIG. 10A shows a waveform indicating an average value of the inductor current subject to VS and the switching frequency limitation.
Figure 10B:
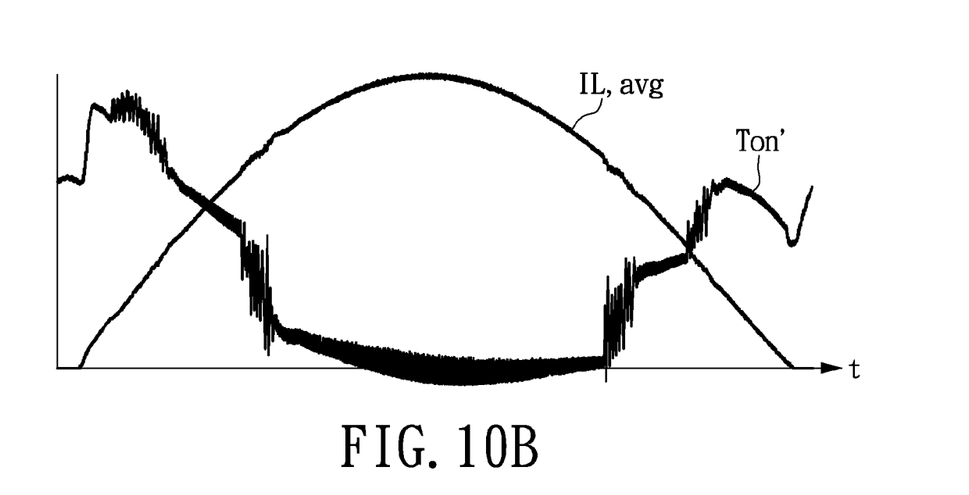
FIG. 10B shows waveforms of the average value of the inductor current and a compensated conduction time according to one embodiment of the instant disclosure.

Please also refer to FIGS. 10A and 10B, FIG. 10A is a waveform diagram illustrating an average value of an inductor current (the current passing through the inductor) traditionally subject to the limitation of the switching frequency with the ZVS and VS while FIG. 10B shows waveforms of the average value of the compensated inductor current average value and a compensated conduction time according to one embodiment of the instant disclosure. As could been seen from FIG. 10A, the average inductor current is largely distorted because of the ZVS, VS and the switching frequency limitation. Thus, it is believed the average inductor current in FIG. 10A may need to be compensated to make up the distortion. One example way to facilitate the compensation is comparing the average inductor current Iavg in FIG. 8 and the reference current signal outputted by the sampling and holding control circuit 35 for the average current control mode operation. It could also be seen that the waveform representative of the compensated inductor current average value is closer to being an ideal sinusoidal wave. It is worth noting that the compensated conduction time Ton' will be discussed later in the description.

Figure 11A:
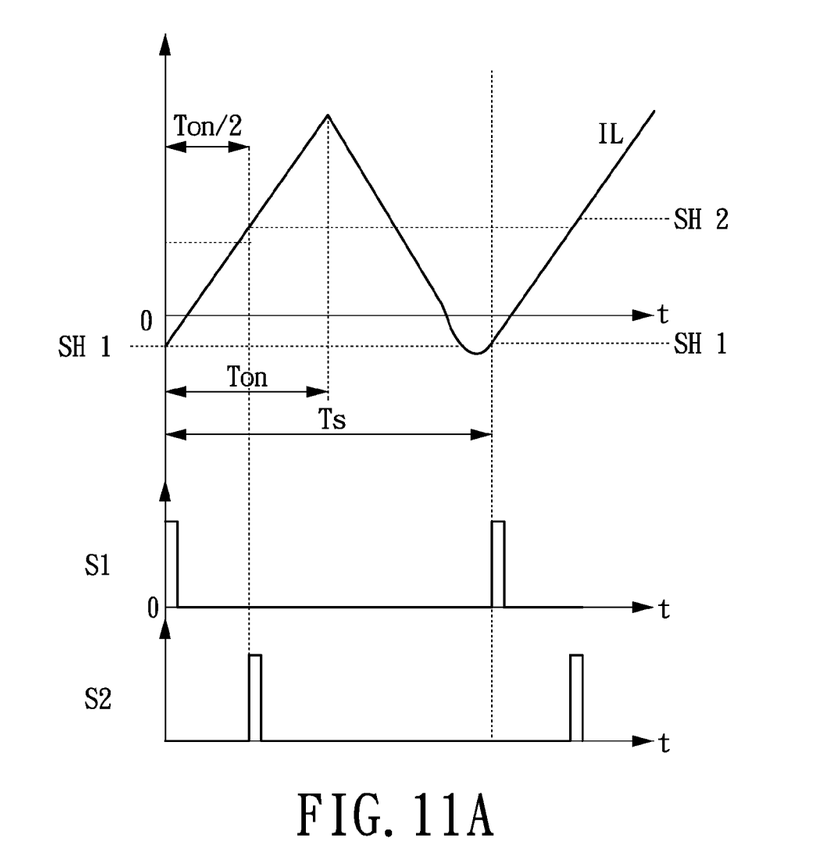
FIG. 11A shows waveforms of a first sampling signal, a second sampling signal, and the inductor current according to one embodiment of the instant disclosure.
Figure 11B:
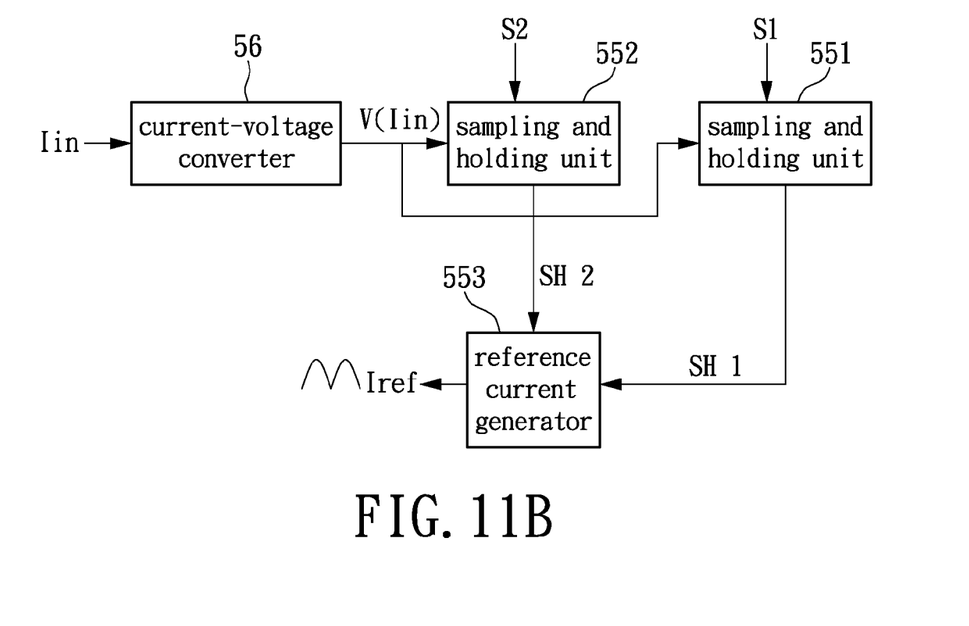
FIG. 11B is a control logic block diagram of using two sampling and holding units for generating the reference current signal according to one embodiment of the instant disclosure.

Please refer to FIGS. 11A and 11B, FIG. 11A shows waveforms of the first sampling signal, the second sampling signal, and the inductor current according to one embodiment of the instant disclosure while FIG. 11B shows a control logic block diagram of two sampling and holding units generating the reference current signal according to one embodiment of the instant disclosure. A trigger signal S1 may be used to control one sampling and holding unit 551 to sample and another trigger signal S2 may be used to control the other sampling and holding unit 552 to sample. At the time the trigger signals S1 and S2 are triggered, the sampling and holding units 551 and 552 may sample the inductor current IL (or the current passing through the inductor).

Figure 12:
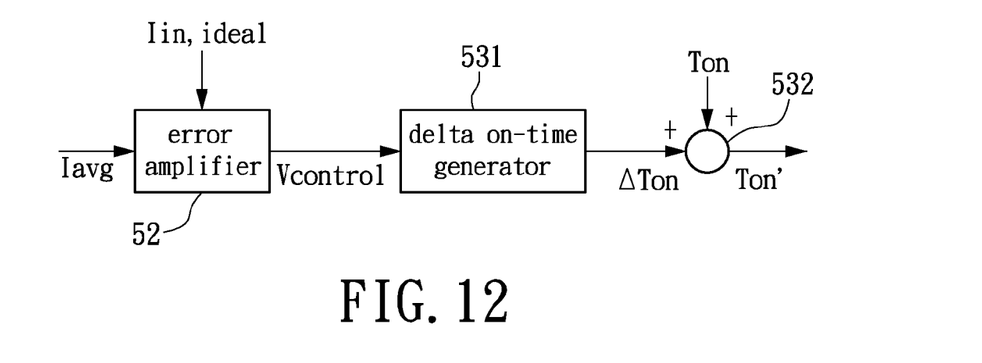
FIG. 12 is a control logic block diagram of compensation using the average current control mode.

Please also refer to FIGS. 11B and 12, FIG. 12 is a control logic block diagram of the compensation using the average current control mode. As the reference current signal Iref is the ideal current value Iin, ideal, when the current reference signal Iref outputted by a reference current generator 553 in FIG. 11B and the average value of the current (or the average current) Iavg are processed by an error amplifier 52, a control signal Vcontrol may be outputted by the error amplifier 52 with the control signal Vcontrol representative of the difference between the reference current signal Iref and the average current Iavg. The control signal Vcontrol may be further processed by a delta on-time generator 531 for the generation of a conduction time compensation value ΔTon. An adder 532 may be adapted to add the time compensation value ΔTon to the conduction time Ton for the preparation of the compensated conduction time Ton'. In the meantime, the input current Iin may be converted in the form of a voltage V(Iin) by a current-voltage converter 56, and the voltage V(Iin) may be further processed by a filter (not shown) in order for the average value of the current Iavg to be obtained.

Figure 13:
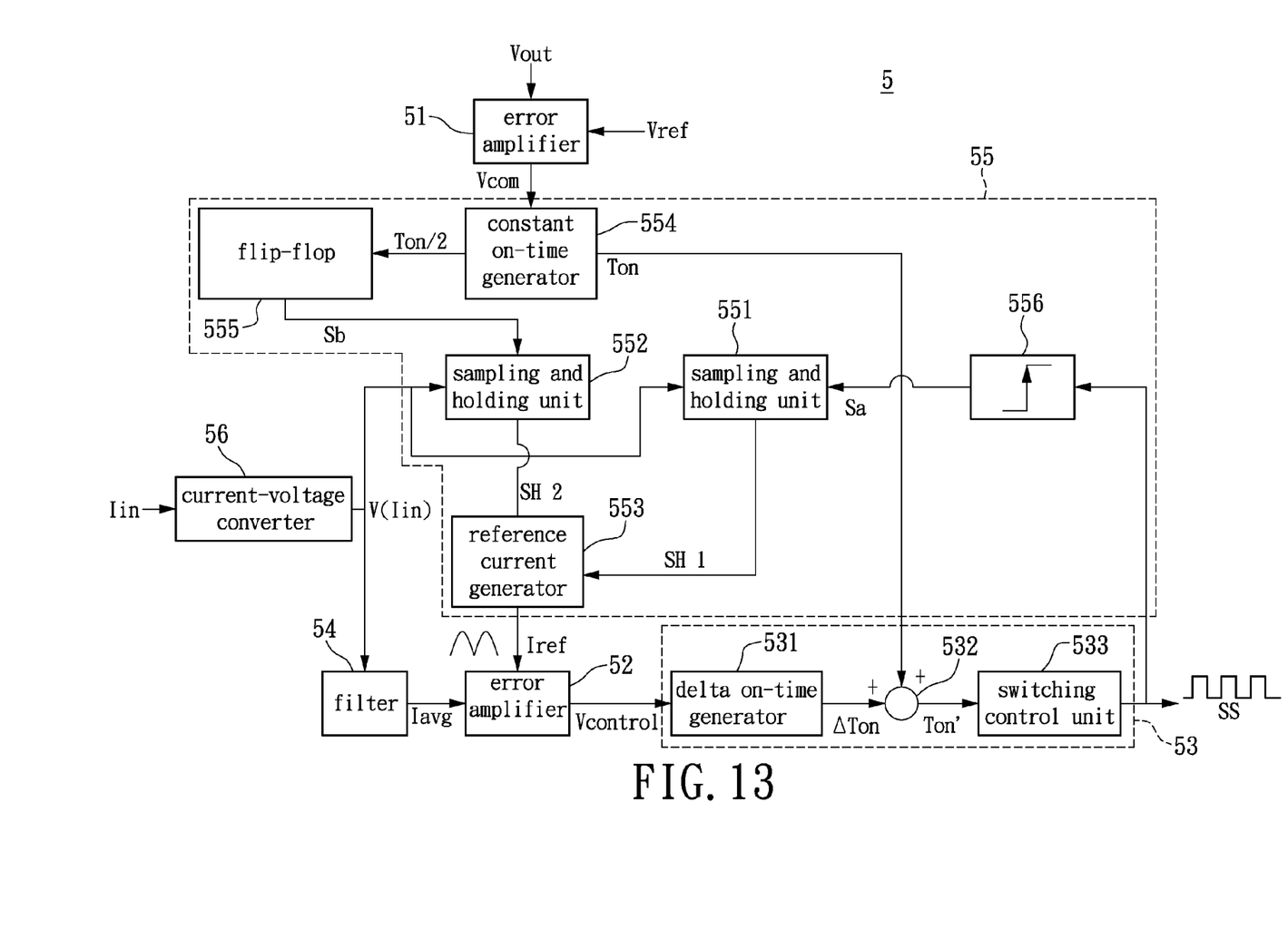
FIG. 13 is a simplified circuit block diagram of another control device for the DC-DC converter according to one embodiment of the instant disclosure.

Please also refer to FIGS. 2 and 13, FIG. 13 is a simplified circuit block diagram of another control device 5 for the DC-DC converter according to one embodiment of the instant disclosure. The circuit architecture of the control device 5 is similar to its counterpart control device 2 of FIG. 2. The control device 5 may include an error amplifier 51, the error amplifier 52, a switching control circuit 53, the filter 54, a sampling and holding control circuit 55, and the current-voltage converter 56. The switching control circuit 53 may include the delta on-time generator 531, the adder 532, and a switching control unit 533. The sampling and holding control circuit 55 may include sampling and holding units 551 and 552, the reference current generator 553, a constant on-time generator 554, a flip-flop 555 and a positive edge flip-flop 556.

The sampling and holding control circuit 55 may be coupled to the error amplifier 51, the current-voltage converter 56 and the error amplifier 52. The filter 54 may be coupled to the current-voltage converter 56 and the error amplifier 52. The error amplifier 52 may be coupled to the switching control circuit 53 when the constant on-time generator 554 may be coupled to the error amplifier 51, the flip-flop 555 and the adder 532. The sampling and holding unit 552 may be coupled to flip-flop 555, the current-voltage converter 56 and the reference current generator 553. The sampling and holding unit 551 may be coupled to the positive edge flip-flop 556, the current-voltage converter 56, and the reference current generator 553. The adder 532 at the same time may be coupled to the constant on-time generator 554, the delta on-time generator 531, and the switching control unit 533.

The output voltage Vout along with the reference voltage signal Vref may be processed via the error amplifier 51, which may therefore generate the feedback signal Vcom for the constant on-time generator 554 for preparing a constant conduction time Ton. The flip-flop 555 may generate a triggering signal Sb midway through the conduction time of the switching element (not shown) (Ton/2), to trigger the sampling and holding unit 552 to fetch the voltage V(Iin) representing the input current Iin.

According to FIG. 13, the filter 54 may be for converting the voltage V(Iin) outputted by the current-voltage converter 56 to the average current value Iavg, the error amplifier 52 compares the output of the filter 54, which may be Iavg, and the reference current signal Iref outputted by the reference current generator 553 before generating the control signal Vcontrol. The switching control circuit 53 according to the control signal Vcontrol may generate the conduction time compensation value ΔTon, and add the conduction compensation value into the conduction time Ton to obtain the compensated conduction time Ton'.

Further according to FIG. 13, the switching control circuit 53 according to the compensated conduction time Ton' may generate the switching signal SS. The positive edge flip-flop 556 based on the switching signal SS may generate a trigger signal Sa to trigger the sampling and holding unit 551, and to enable the sampling and holding unit 551 to capture/sample the voltage V(Iin) outputted from the current-voltage converter 56 when the switching element is just conducted. In other words, the sampling and holding unit 551 at the beginning of the conduction time of the switching element may sample the inductor current (or the current passing through the inductor of the DC-DC converter) to obtain the first sampling signal.

Another Example Embodiment of Control Device for DC-DC Converter

Figure 14:
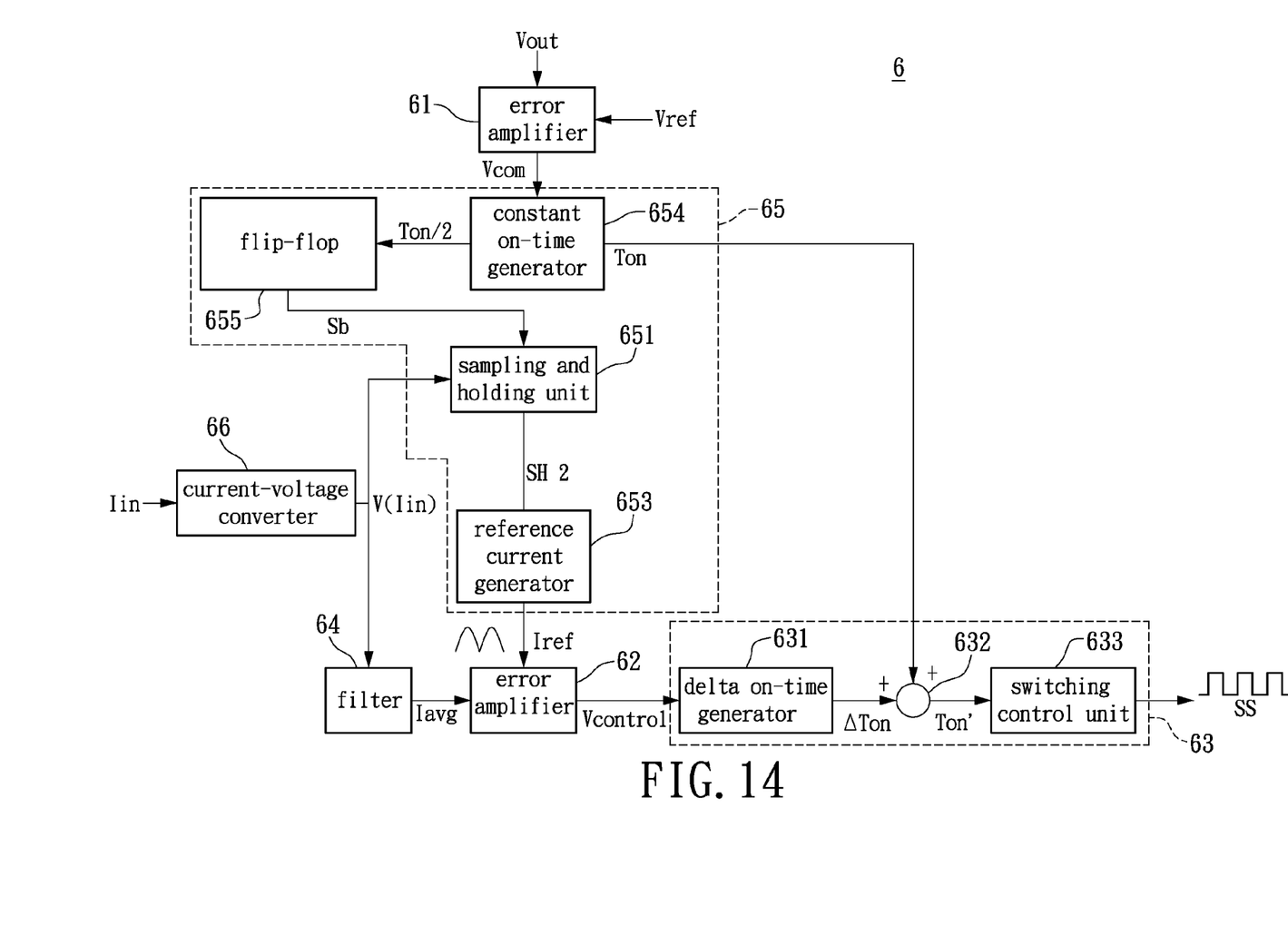
FIG. 14 is a simplified circuit block diagram of another control device for the DC-DC converter according to one embodiment of the instant disclosure.

Please also refer to FIGS. 2, 13 and 14, FIG. 14 is a simplified circuit block diagram of another control device 6 according to one embodiment of the instant disclosure. Similar to the sampling and holding control circuit 35 having a single sampling and holding unit, which is capable of generating the reference current signal Iref by sampling the inductor current (average current value of the inductor current) through this single sampling and holding unit, the control device of FIG. 14 could rely on one sampling and holding unit as well. The control device 6 may include error amplifiers 61 and 62, a switching control circuit 63, a filter 64, a sampling and holding control circuit 65, and a current-voltage converter 66. The switching control circuit 63 may include a delta on-time generator 631, an adder 632 and a switching control unit 633. The sampling and holding control circuit 65 may further include a sampling and holding unit 651, a reference current generator 653, a constant on-time generator 654 and a flip-flop 655. The operation of the control device 6 is similar to that of the control device 5 of FIG. 13, despite the control device 6 does not include the sampling and holding unit 551 and the positive edge flip-flops 556. Meanwhile, the sampling and holding unit 651 samples midway through the conduction time of the switching element (Ton/2), which may be another difference between the control devices 5 and 6.

Embodiment of Control Method for Controlling DC-DC Converter

Figure 15:
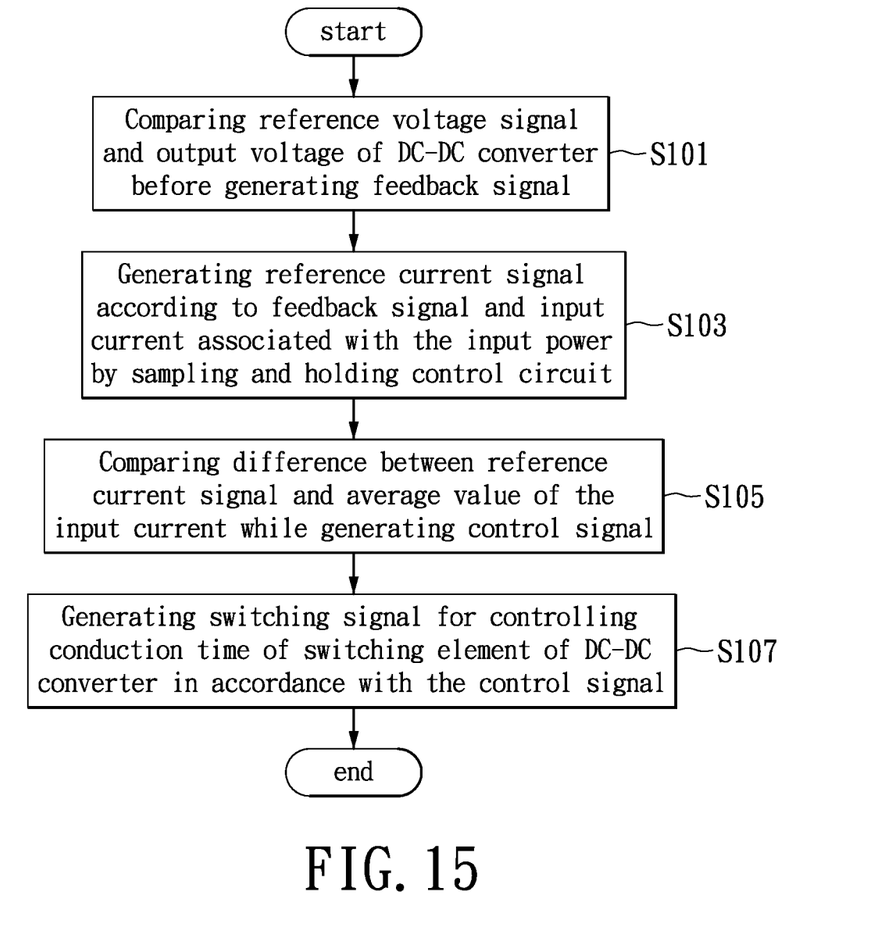
FIG. 15 is a control method for controlling the DC-DC converter according to one embodiment of the instant disclosure.

Please also refer to FIGS. 2 and 15, FIG. 15 is a flowchart of a control method controlling the DC-DC converter according to one embodiment of the instant disclosure. The DC-DC converter is configured to receive an input power to generate an output voltage. The control method may include the following steps. In step S101, the method may compare a reference (reference voltage signal Vref) and the output voltage Vout of the DC-DC converter, before generating a feedback signal Vcom. In step S103, the method may employ the sampling and holding control circuit to generate a reference current signal Iref according to the feedback signal Vcom and an input current Iin associated with the input power. In step S105, the method may compare the difference between the reference current signal Iref and an average value of the input current Iin (or an average current Iavg) while generating a control signal Vcontrol. In step S107, in accordance with the control signal Vcontrol the method may generate a switching signal SS, which is used to control the conduction time (Ton) of the switching element of the DC-DC converter.

Figure 16:
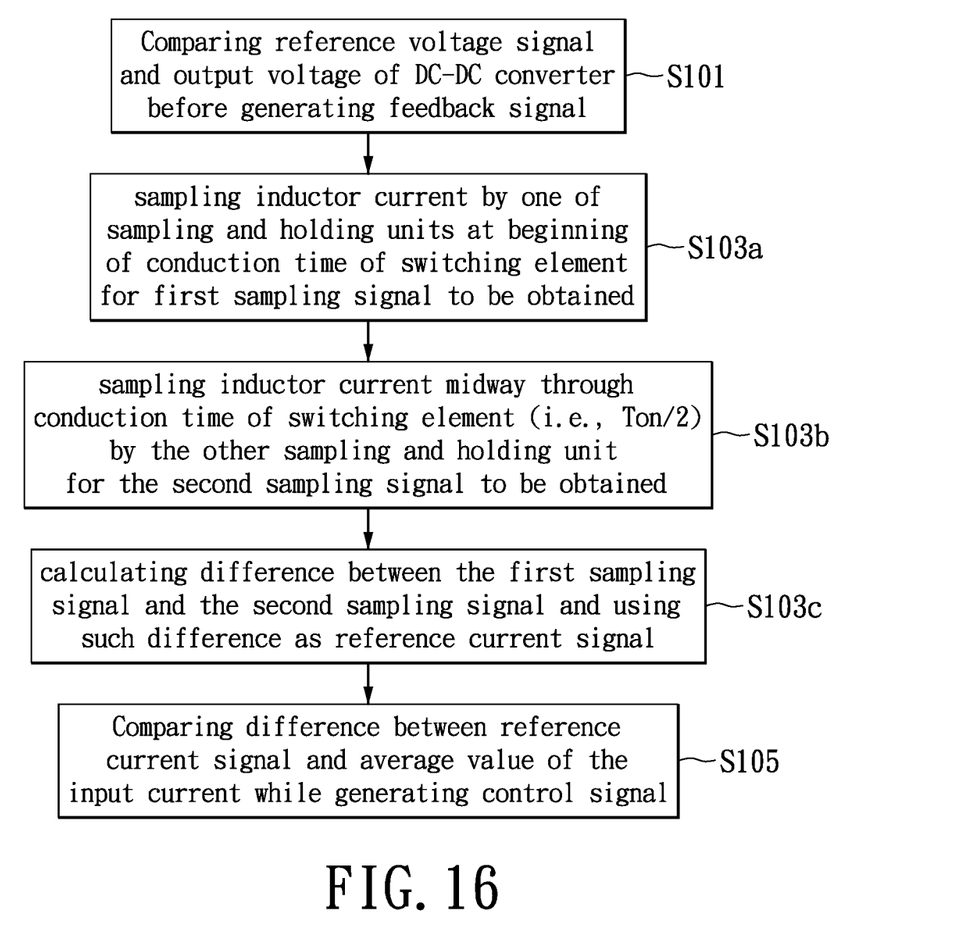
FIG. 16 further illustrates step S103 of FIG. 15.

Please also refer to FIGS. 2, 15 and 16, FIG. 16 further illustrates step S103 of FIG. 15. When the sampling and the holding control circuit has two sample holding units (e.g., the control device 5 shown in FIG. 13 includes such sampling and holding control circuit), step S103 may include the following steps. In step S103a, one of the sampling and holding units may be used to sample an inductor current at the beginning of the conduction time of switching element for the first sampling signal SH1 to be obtained. In step S103b, the other sampling and holding unit may be used to sample the inductor current midway through the conduction time of the switching element (i.e., Ton/2) for the second sampling signal SH2 to be obtained. In step S103c, the difference between the first sampling signal and the second sampling signal may be calculated and such difference may be used as the reference current signal Iref.

In addition, step S107 where the switching signal SS may be generated according to the control signal Vcontrol may further based on the control signal Vcontrol generate the conduction time compensation value ΔTon, before adding the same to the conduction time of the switching element to obtain of the compensated conduction time Ton'. The compensated conduction time Ton' may serve as the basis on which the switching signal SS is generated.

The embodiments according to the instant disclosure regarding the control device for the DC-DC converter and the control method controlling the same may avoid the use of the multiplier and may be capable of performing the power factor correction. When the instant disclosure is applied in the power factor correction context, because of the reference current signal may be immune from the impact associated with the variation in the input voltage, the output voltage, VS, ZVS, and the switching frequency limitation, the reference current signal when distorted may be effectively compensated, reducing the portion of the input current accounted for by harmonic waves.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A control device for a direct current-direct current (DC-DC) converter receiving an input power and generating an output voltage, comprising:
a first error amplifier for comparing a reference voltage signal and the output voltage to generate a feedback signal;
a sampling and holding control circuit coupled to the first error amplifier for generating a reference current signal according to the feedback signal and an input current associated with the input power;
a filter for receiving the input current associated with the input power and generating an average current value according to the input current;
a second error amplifier coupled to the sampling and holding and the filter for comparing the reference current signal and the average current value before generating a control signal; and
a switching control circuit coupled to the second error amplifier for generating a switching signal according to the control signal from the second error amplifier, wherein the switching signal controls a conduction time of a switching element of the DC-DC converter.

2. The control device according to claim 1, wherein the DC-DC converter comprises an inductor coupled to the switching element, and the sampling and holding control circuit comprises a sampling and holding unit for sampling a current of the inductor in order for the reference current signal to be generated.

3. The control device according to claim 2, wherein the sampling and holding unit samples the current of the inductor midway through the conduction time of the switching element.

4. The control device according to claim 1, wherein the DC-DC converter comprises an inductor coupled to the switching element, the sampling and holding circuit comprises a first sampling and holding unit and a second sampling and holding unit for sampling a current of the inductor when the switching element is conducted to obtain a first sampling signal and sampling the current of the inductor midway through the conduction time of the switching element to obtain a second sampling signal, respectively, and the reference current signal is the difference between the first sampling signal and the second sampling signal.

5. The control device according to claim 1, wherein the switching control circuit generates a conduction time compensation value according to the control signal, adds the conduction time compensation value to the conduction time of the switching element to obtain a compensated conduction time, and generates the switching signal according to the compensated conduction time.

6. A control method for controlling a DC-DC converter, which receives an input power and generates an output voltage, comprising:
comparing a reference voltage and the output voltage of the DC-DC converter to generate a feedback signal;
utilizing a sampling and holding control circuit to generate a reference current signal according to the feedback signal and an input current associated with the input power;

comparing the reference current signal and an average current value of the input current to generate a control signal; and generating a switching signal according to the control signal, wherein the switching signal controls a conduction time of a switching element of the DC-DC converter.

7. The control method according to claim 6, wherein the DC-DC converter comprises an inductor coupled to the switching element, and the reference current signal is representative of an average current value of the current of the inductor.

8. The control method according to claim 7, wherein the reference current signal is a current value of the current of the inductor when the switching element is midway through the conduction time thereof.

9. The control method according to claim 6, wherein the DC-DC converter comprises an inductor coupled to the switching element and utilizing the sampling and holding control circuit according to the feedback signal and the input current associated with the input power to generate the reference current signal further comprises:

sampling the current of the inductor to obtain a first sampling current value when the switching element is conducted;

sampling the current of the inductor to obtain a second sampling current value when the switching element is midway through the conduction time of the switching element; and calculating the difference between the first sampling current value and the second sampling current value to obtain the reference current signal.

10. The control method according to claim 6, wherein generating the switching signal according to the control signal further comprises generating a conduction time compensation value according to the control signal and adding the conduction time compensation value to the conduction time of the switching element to a compensated conduction time on basis of which the switching signal is generated.

* * * * *